(12) United States Patent
Sauer

(10) Patent No.: US 10,381,179 B2
(45) Date of Patent: Aug. 13, 2019

(54) GAS-INSULATED MEDIUM VOLTAGE SWITCHGEAR WITH A CIRCUIT BREAKER POLE PART ARRANGEMENT

(71) Applicant: ABB Schweiz AG, Baden (CH)

(72) Inventor: Manfred Sauer, Ratingen (DE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/898,664

(22) Filed: Feb. 19, 2018

(65) Prior Publication Data
US 2018/0174785 A1 Jun. 21, 2018

Related U.S. Application Data

(63) Continuation of application No. PCT/EP2016/070414, filed on Aug. 30, 2016.

(30) Foreign Application Priority Data

Aug. 31, 2015 (EP) .................................... 15183183

(51) Int. Cl.
*H01H 33/666* (2006.01)
*H01H 33/40* (2006.01)
(Continued)

(52) U.S. Cl.
CPC ...... *H01H 33/6661* (2013.01); *H01H 33/022* (2013.01); *H01H 33/40* (2013.01);
(Continued)

(58) Field of Classification Search
CPC .... H01H 33/022; H01H 33/40; H01H 33/565; H01H 33/666; H01H 33/6661; H02B 13/0352; H02B 13/0354; H02B 13/045
(Continued)

(56) References Cited

U.S. PATENT DOCUMENTS 5,864,108 A * 1/1999 Rohling ............... H01H 33/666
218/134
6,529,368 B2 * 3/2003 Koga ................. H02B 13/0354
361/605
(Continued)

FOREIGN PATENT DOCUMENTS

DE 10305464 A1 8/2004
EP 1998347 A1 12/2008
(Continued)

*Primary Examiner* — Edwin A. Leon
*Assistant Examiner* — William A Bolton
(74) *Attorney, Agent, or Firm* — Leydig, Voit & Mayer, Ltd.

(57) ABSTRACT

A gas-insulated medium voltage switchgear includes: a circuit breaker pole part arrangement in a gastight compartment of the switchgear; a drive arrangement for switching actuation of the circuit breaker, the drive arrangement and the pole part arrangement being fixed on a common plate or frame, which is provided with the gastight compartment, and being configured to close the gastight compartment gastightly such that in a completely mounted position of the plate or frame, the circuit breaker pole part arrangement is positioned inside the gastight compartment, and the drive arrangement is positioned outside the gastight compartment; and a standardized circuit breaker drive adaptable to switchgear arrangements with different pole distances. The plate or frame is provided with holes, in which gastight mechanical feedthroughs are arranged, through which the standardized circuit breaker drive is coupled with each vacuum interrupter in the circuit breaker pole part arrangement.

6 Claims, 2 Drawing Sheets

(51) Int. Cl.
*H01H 33/56* (2006.01)
*H01H 33/02* (2006.01)
*H02B 13/035* (2006.01)

(52) U.S. Cl.
CPC ........ *H01H 33/565* (2013.01); *H01H 33/666* (2013.01); *H02B 13/0352* (2013.01)

(58) Field of Classification Search
USPC ............... 218/118, 68, 42, 134, 139, 155
See application file for complete search history.

(56) References Cited

U.S. PATENT DOCUMENTS

| | | | | |
|---|---|---|---|---|
| 8,115,123 | B2* | 2/2012 | Singh | H01H 9/0072 |
| | | | | 200/50.21 |
| 8,237,075 | B2* | 8/2012 | Isoya | H01H 33/6661 |
| | | | | 218/118 |
| 8,629,366 | B2* | 1/2014 | Reuber | H01H 33/66207 |
| | | | | 218/44 |
| 8,642,912 | B2* | 2/2014 | Lee | H01H 33/022 |
| | | | | 218/120 |
| 2005/0139579 | A1* | 6/2005 | Sakamoto | H01H 3/46 |
| | | | | 218/118 |

FOREIGN PATENT DOCUMENTS

| | | |
|---|---|---|
| EP | 2261941 A1 | 12/2010 |
| EP | 2325858 A1 | 5/2011 |
| WO | WO 2004055850 A1 | 7/2004 |

* cited by examiner

GAS-INSULATED MEDIUM VOLTAGE SWITCHGEAR WITH A CIRCUIT BREAKER POLE PART ARRANGEMENT

CROSS-REFERENCE TO PRIOR APPLICATION

This application is a continuation of International Patent Application No. PCT/EP2016/070414, filed on Aug. 30, 2016, which claims priority to European Patent Application No. EP 15183183.1, filed on Aug. 31, 2015. The entire disclosure of both applications is hereby incorporated by reference herein.

FIELD

The invention relates to a gas-insulated medium voltage switchgear with a circuit breaker pole part arrangement in a gastight compartment of the switchgear, and with a drive arrangement for switching actuation of the circuit breaker, wherein the drive as well as the pole part arrangement is fixed on a common plate or frame, which is provided with a gastight sealing, and is closing the aforesaid compartment gastightly in such, that in the completely mounted position of the plate or frame, the pole parts are positioned inside, and the drive is positioned outside the aforesaid gastight compartment.

BACKGROUND

In general, that means in the state of the art, such medium voltage vacuum circuit breakers mainly consist of a drive mechanism and electric poles. Vacuum interrupters are installed within the poles. The drive is connected to the vacuum interrupters via pushrods which actuates the mechanical movement of the switching contacts inside the vacuum interrupters. The poles provide the mechanical support to the vacuum interrupters, and are fixed to the circuit breaker structure and therewith to the gas-insulated switchgear panel.

The pole-design has to withstand the dielectric, thermal and mechanical stress during service and testing conditions.

In respect of dielectric stress the insulation parts of electric poles must provide sufficient electric creepage distance on electrically stressed paths and sufficient high electric resistivity. Furthermore the design should avoid thin gas gaps between insulating and electrically stressed parts where an accumulation of the electric field appears. The poles have to be arranged inside the switchgear in a way that sufficient electric clearance is provided between the poles and earthed parts of the switchgear and between the poles in multiphase systems.

In respect of thermal stress the insulating parts of electric poles must withstand the ambient temperature in the circuit breaker compartment and the temperature of conducting parts with which they are in contact. Mechanical and dielectrical properties of the insulating parts of the poles must not change inappropriately.

In respect of mechanical stress, the pole design and especially the mechanically supporting parts of the poles must withstand the mechanical stress during switching of the circuit breaker and the electromagnetic forces during fault current.

In general the electric poles of medium voltage circuit breakers are arranged in parallel to each other. The mechanical stress caused by electromagnetic forces on parallel poles in a switchgear which is subject to fault current is directly proportional to the square of the fault current and indirect proportional to the pole distance.

The electric field and therewith the dielectric withstand of the gas volume between parallel poles depend indirectly on the pole-distance.

Furthermore the pole distance depends on the width of the poles, the width of the interrupting units inside the poles, on the switchgear in which the circuit breaker will be installed, the drive mechanism of the circuit breaker, etc.

As a consequence different ratings and designs of switchgears require different pole distances of the circuit breakers. In general circuit breakers with different pole distances comprise different drives which are specially designed for the corresponding pole-distance.

Known constructions lead to the following disadvantages.
High variance/number of parts and subassemblies
Preproduction of subassemblies not meaningful due to low needed volume per year of each part
Long production time
High production costs
Low quantities per part and year
High effort on product design maintenance due to high number of parts and bill of materials
Outsourcing of circuit breaker subassemblies difficult
Each rating requires characteristic design
No interchangeability of parts of different circuit breakers

SUMMARY

In an embodiment, the present invention provides a gas-insulated medium voltage switchgear, comprising: a circuit breaker pole part arrangement in a gastight compartment of the switchgear; a drive arrangement for switching actuation of the circuit breaker, the drive arrangement and the pole part arrangement being fixed on a common plate or frame, which is provided with the gastight compartment, and being configured to close the gastight compartment gastightly such that in a completely mounted position of the plate or frame, the circuit breaker pole part arrangement is positioned inside the gastight compartment, and the drive arrangement is positioned outside the gastight compartment; and a standardized circuit breaker drive adaptable to switchgear arrangements with different pole distances, wherein the plate or frame is provided with holes, in which gastight mechanical feedthroughs are arranged, through which the standardized circuit breaker drive is coupled with each vacuum interrupter in the circuit breaker pole part arrangement, and wherein by predefinable positioning of the holes, the plate or frame is configured to be adapted to the pole distance in the gastight compartment.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
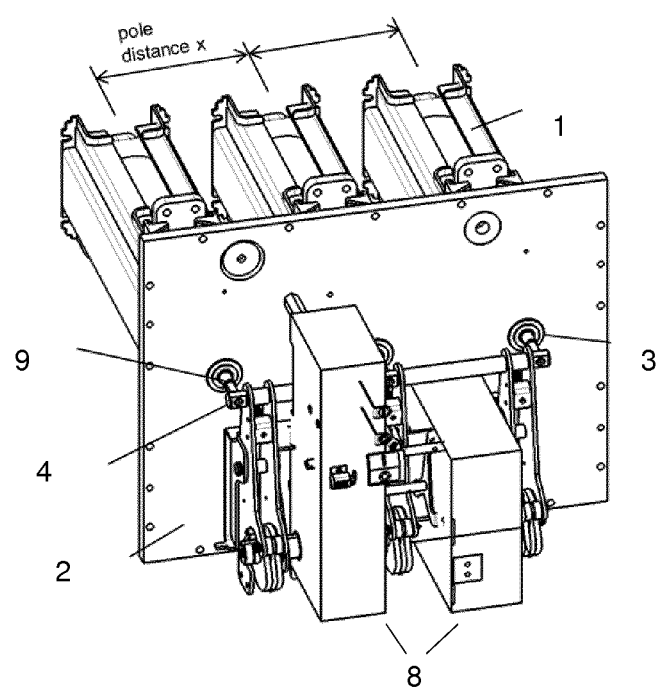
FIG. 1: Embodiment with a pole distance x

In an embodiment, the present invention provides a medium voltage vacuum circuit breaker for gas-insulated switchgear that solves these problems.

In an embodiment, the present invention provides a method for manufacturing or assembling of such a medium voltage vacuum circuit breaker for gas-insulated switchgear.

Constructural basical features for the use of the invention are, that a standarized circuit breaker drive is adaptable to switchgear arrangements with different pole distances, and that the plate or frame is provided with holes, in which gastight mechanical feedthroughs are arranged in, through which the drive is coupled with each of the vacuum interrupters in the pole parts, and that by predefinable positioning of the holes, the plate or frame can easily be adapted to the pole distance in the gastight compartment. So the drive itself, which is located outside the gastight compartment, can be mounted independently from the arranged elements inside the gastight compartment. Also the maintenance service of the drive can be handled from outside the gastight compartment without the need of opening it.

Key feature of the invention in this context is, that a standardized circuit breaker drive can be used or can be easily adapted to switchgear arrangements with different pole-distances.

Additionally to that, the invention is, that the plate or frame is provided with holes, in which gastight mechanical feedthroughs are arranged in, through which the drive is coupled with each of the vacuum interrupters in the pole parts, and that by predefinable positioning of the holes, the plate or frame can easily be adapted to the pole distance in the gastight compartment. Important is, that standardized and same drives can be used in different arrangements with different pole distances.

A further important and advantageous embodiment is, that for a three phase arrangement of circuit breaker pole parts in one gastight compartment, the drive is coupled with one common main shaft, which transforms a rotational movement of the spring drive into a linear movement for each vacuum interrupter in such, that via a curve disc the rotational movement of the main shaft will be transformed into a linear movement of a movable contact of the vacuum interrupter by three pairs of levers, and that the adaption to a predefined pole part distance is realized only by exchange of the common shaft and the coupling shaft, adapted to the desired pole distance.

In a further advantageous embodiment, the drive is a spring drive.

The plate or frame is provided with gastight mechanical feedthrough or feedthroughs, through which the drive is coupled with the vacuum interrupter in the pole part. This leads to the above already mentioned advantages.

In a further advantageous embodiment, said levers are coupled by means of coupling rod which is moved by the levers in perpendicular direction to the axis of the rod.

A further important embodiment is given by predefinable positioning of the holes of the mechanical feedthroughs in the plate or frame, the plate or frame can easily be adapted to the pole distance in the gastight compartment, so that the drive can be adapted to the used pole-distance.

A further advantageous embodiment is, that the pole parts each consist of a pair of half shells, which will be assembled together, with the vacuum interrupter between the half shells.

In a further advantageous embodiment, the already aforesaid advantage can be caused in that the coupling rod is via its chosen length adapted to the pole distance, used in the switchgear.

A further and final important advantageous embodiment is, that the aforesaid elements are sampled on modules in such, that the spring of the drive and/or that a motor for charging the spring is arranged on a separateable charging module and/or that the movement transmission elements, and/or that means mechanical transmission elements like the levers and the curve discs are arranged on a separateable transmission module, and/or that finally latching elements are arranged on a latching module.

The assembling can be done stepwise by connecting fully premanufactured modules in such, that also an adaption to different pole distances is not disturbed, but supported by the module construction. The plate or frame with other feedthrough distances has to be exchanged, in cases of adapting to other pole distances. With that, the position of the curve discs and levers in main shaft and the coupling rod length has to be adapted.

Figure 2:
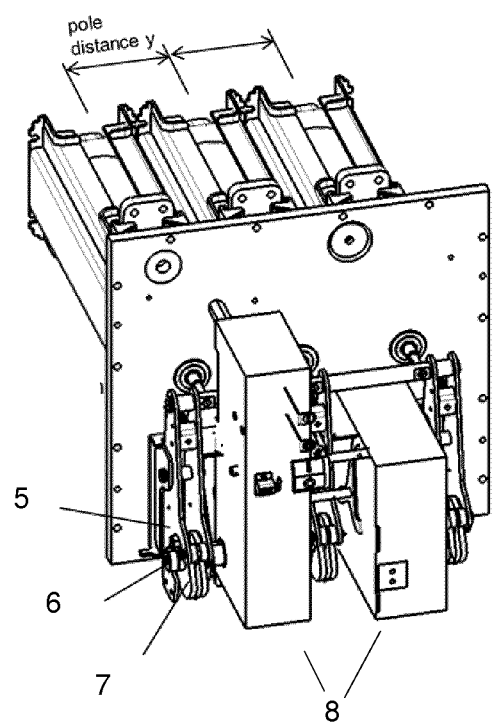
FIG. 2: Embodiment with a pole distance y, different from x

A drive and a mechanical adaptable system for medium voltage vacuum interrupters for gas-insulated switchgear is shown in FIG. 1, and for a different pole distance in FIG. 2, which is able to drive the movable contacts inside the vacuum interrupters, also in use of switchgear arrangements with different pole-distances. The concerning drive 8 is based on a spring drive mechanism. The drive 8 is mounted on a stiff aluminum plate 2 which is fixed to the switchgear panel. The fixation of said aluminum plate to the panel is gastight, and not further detailed shown in the figures. The electric pole parts 1 of the circuit breaker are fixed on the opposite side of the drive 8 on the aluminum plate 2. The driving force from the circuit breaker drive 8 to the poles 1, or better saying, to the movable contacts of the interrupters inside the pole parts, is transmitted by push rods 9 through gastight mechanical feedthroughs 3 in the aluminum plate 2. The distance between the feed throughs 3 depend on the pole-distance of the circuit breaker.

Within the aforesaid invention, related drive curve discs 7 are fixed on the right hand end, middle and left hand end of the rotating main shaft of the circuit breaker. Said curve discs transform the rotating motion of the main shaft 6 into a linear movement of three pairs of levers 5. Said levers 5 are coupled by means of a coupling rod 4, which is moved by the levers 5 in perpendicular direction to the axis of the rod. Said coupling rod comprises holes to which the drive rods of the poles of the circuit breaker are installed. The distance in between the holes and the aforesaid feedthroughs 3 is chosen according to the pole-distance x for which the drive is applicable. Thus one drive is applicable to circuit breakers of different ratings with different pole-distances by simply using different coupling rods with different distances between the holes in the rods. Thus all parts of the drive 8, except the coupling rod 4 are identical for different pole-distances x, y.

A special embodiment is where the drive 8 is installed in a circuit breaker with vacuum interrupter, where the poles are comprising the half shells, and consist of a vacuum interrupter, push rods, connecting parts etc., like it is shown for different pole-distances in FIGS. 1 and 2.

A further embodiment is where the length of the coupling rod depends on the pole-distance of the circuit breaker.

A further embodiment is where the drive is realized in a modular way i.e. consisting of e.g. an energy storage and charging module, a transmission module, a latching module etc.

A further embodiment is that the pole-distance measures 120 mm, 150 mm or 210 mm respectively.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

NUMBERING 1 pole parts
2 plate or frame
3 gastight mechanical feedthrough
4 coupling rod
5 lever
6 main shaft
7 curve disc
8 drive
9 push or drive rod
x,y pole distances

What is claimed is:

1. A gas-insulated medium voltage switchgear, comprising:
    a circuit breaker pole part arrangement in a gastight compartment of the switchgear;
    a drive arrangement for switching actuation of the circuit breaker, the drive arrangement and the pole part arrangement being fixed on a common plate or frame, which is provided with the gastight compartment, and being configured to close the gastight compartment gastightly such that in a completely mounted position of the plate or frame, the circuit breaker pole part arrangement is positioned inside the gastight compartment, and the drive arrangement is positioned outside the gastight compartment; and
    a circuit breaker drive adaptable to switchgear arrangements with different pole distances,
    wherein the plate or frame is provided with holes, in which gastight mechanical feedthroughs are arranged, through which the circuit breaker drive is coupled with each vacuum interrupter in the circuit breaker pole part arrangement,
    wherein by predefinable positioning of the holes, the plate or frame is configured to be adapted to the pole distance in the gastight compartment,
    wherein for a three phase arrangement of circuit breaker pole parts in one gastight compartment, the circuit breaker drive is coupled with one common main shaft, which is configured to transform a rotational movement of a spring drive into a linear movement for each vacuum interrupter such that, via a curve disc, a rotational movement of the common main shaft is transformed into a linear movement of a movable contact of the vacuum interrupter by three pairs of levers, and
    wherein adaptation of the switchgear to a predefined pole part distance is realized only by exchange of the common main shaft and a coupling rod, adapted to a desired pole distance.

2. The gas-insulated medium voltage switchgear according to claim 1, wherein the circuit breaker drive comprises a spring drive.

3. The gas-insulated medium voltage switchgear according to claim 1, wherein the levers are coupled by means of the coupling rod, which is configured to be moved by the levers in a direction perpendicular to an axis of the rod.

4. The gas-insulated medium voltage switchgear according to claim 1, wherein the pole parts of the circuit breaker pole part arrangement each comprise of a pair of two half shells, configured to be assembled together, with the vacuum interrupter between the half shells.

5. The gas-insulated medium voltage switchgear according to claim 1, wherein the coupling rod is, via a length of the coupling rod, adapted to the pole distance used in the switchgear.

6. A method for manufacturing or assembling the gas-insulated medium voltage switchgear according to claim 1, wherein for adaptation to different desired pole distances, apart from that, a different plate or frame is used, with predefined holes in which the mechanical feedthroughs are located so as to match the used pole distance of the circuit breaker pole parts.

* * * * *